US012386080B2

(12) United States Patent
Sleewaegen et al.

(10) Patent No.: US 12,386,080 B2
(45) Date of Patent: Aug. 12, 2025

(54) METHOD AND SYSTEM FOR DETERMINING A PHASE OF A GNSS CARRIER

(71) Applicant: Septentrio N.V., Heverlee (BE)

(72) Inventors: Jean-Marie Sleewaegen, Jette (BE); Wim De Wilde, Oud-Heverlee (BE)

(73) Assignee: Septentrio N.V., Heverlee (BE)

( * ) Notice: Subject to any disclaimer, the term of this patent is extended or adjusted under 35 U.S.C. 154(b) by 353 days.

(21) Appl. No.: 18/245,244

(22) PCT Filed: Oct. 4, 2021

(86) PCT No.: PCT/EP2021/077324
§ 371 (c)(1),
(2) Date: Mar. 14, 2023

(87) PCT Pub. No.: WO2022/069770
PCT Pub. Date: Apr. 7, 2022

(65) Prior Publication Data
US 2023/0367021 A1 Nov. 16, 2023

(30) Foreign Application Priority Data

Oct. 4, 2020 (EP) .................................... 20199973

(51) Int. Cl.
G01S 19/32 (2010.01)
G01S 19/29 (2010.01)
G01S 19/43 (2010.01)
(52) U.S. Cl.
CPC .............. G01S 19/32 (2013.01); G01S 19/29 (2013.01); G01S 19/43 (2013.01)

(58) Field of Classification Search
CPC ........... G01S 19/32; G01S 19/29; G01S 19/43
See application file for complete search history.

(56) References Cited

U.S. PATENT DOCUMENTS 6,150,978 A 11/2000 McBurney
10,054,687 B2 * 8/2018 Whitehead ............... H04K 3/65
(Continued)

FOREIGN PATENT DOCUMENTS

WO 2020104594 A1 5/2020

OTHER PUBLICATIONS

Extended European Search Report from EP Application No. 20199973.7 (filed Oct. 4, 2019), mailed Mar. 31, 2021.
(Continued)

Primary Examiner — Dhaval V Patel

(57) ABSTRACT

The application pertains to a method for determining a phase of a target data carrier in a GNSS system, the method comprising: in an initialization phase: determining, at a first point in time, a bias term of a synthetic carrier phase function constructed to mimic a phase of the target data carrier; and in an operational phase: using said bias term determined in said initialization phase, obtaining a value of the synthetic carrier phase function, said value corresponding to a second point in time; and comparing a measured phase of the target data carrier at the second point in time to said value to assess the presence or absence of a half-cycle phase discrepancy; wherein said synthetic carrier phase function is constructed to mimic said phase of said target data carrier at points in time subsequent to said first point in time without requiring readjustment of said determined bias term.

20 Claims, 2 Drawing Sheets

(56) References Cited

U.S. PATENT DOCUMENTS

| | | | |
|---|---|---|---|
| 10,534,087 B1* | 1/2020 | Brewer | G01S 19/43 |
| 2015/0234053 A1* | 8/2015 | Psiaki | H04K 3/90 |
| | | | 342/357.51 |
| 2018/0045833 A1* | 2/2018 | Wu | G01S 19/54 |
| 2021/0286090 A1* | 9/2021 | Kozlov | G01S 19/04 |

OTHER PUBLICATIONS

International Search Report and Written Opinion from PCT Application No. PCT/EP2021/077324 (filed Oct. 4, 2021), mailed Jan. 28, 2022.

Seok, Bo Son et al: "A new half cycle ambiguity resolution method for GPS attitude determination system," GPS 2000—Proceedings of the 13thInternational Technical Meeting of the Satellite Division of the Institute of Navigation (ION GPS 2000), The Institute of Navigation, Manassas, VA, Sep. 22, 2000.

* cited by examiner

METHOD AND SYSTEM FOR DETERMINING A PHASE OF A GNSS CARRIER

FIELD OF THE INVENTION

The present invention pertains to a method and system for retrieving phase information from a GNSS signal. More in particular, the present invention pertains to the resolution of sub-period phase ambiguity that may exist in BPSK-modulated ranging signals.

BACKGROUND

Global Navigation Satellite Systems (GNSS) are widely used to provide position, velocity and time to any user on or near the Earth's surface. A GNSS comprises, among other things, a constellation of multiple navigation satellites (GNSS satellites) which transmit dedicated navigation signals known as "ranging signals". Most known is the Global Positioning System (GPS) developed by the United States. Other systems include the European Galileo system, the Russian GLONASS and the Chinese BeiDou system.

Most GNSS satellites transmit multiple ranging signals in various frequency bands. For example, the third generation of BeiDou satellites transmits on the B1I (1561.098 MHz), B1C (1575.42 MHz), B3I (1268.52 MHz), B2a (1176.45 MHz) and B2b (1207.14 MHz) carrier frequencies. All carriers are modulated by one or more known pseudorandom codes unique to each satellite. Some carriers, known as "data carriers", are further modulated by the bits of a navigation message. The carriers that are not modulated by navigation bits are called "pilot carriers".

In GNSS receivers, the different frequency bands are first amplified and downconverted to baseband in analog frontend circuits, and the signals from the different satellites are acquired and tracked in dedicated tracking channels. For each tracked signal of each satellite, the receiver measures the transmission delay from the satellite to the receiver and the phase of the incoming carrier wave. The measured delay, multiplied by the speed of light, is called the pseudorange. The carrier phase measurements are much more accurate than the pseudoranges but are affected by an ambiguity of an integer number of carrier wavelengths.

The phenomenon of integer ambiguity and the techniques to overcome it are well-known in the art. The present invention relates to the problem of half-cycle ambiguity that affects the carrier phase measurements of data carriers, as explained in the following paragraphs.

In data carriers, the navigation bit modulation follows the binary phase-shift keying (BPSK) scheme, in which the phase of the carrier is offset by 0° or 180° (one half of a carrier cycle) depending on the value of the bit to be transmitted (1 or 0). In such a modulation scheme, a global shift of the unmodulated carrier by 180° is not distinguishable from an inversion of all the navigation bits. For example, upon receiving the phase sequence (0°, 180°, 180°, 0°, 0°), the receiver cannot distinguish the hypothesis that the unmodulated carrier phase was 0° and the navigation bits were (0, 1, 1, 0, 0), from the hypothesis that the carrier phase was 180° with navigation bits (1, 0, 0, 1, 1). An ambiguity of 180° exists until the receiver can determine the correct bit sequence. This ambiguity is referred to as the "half-cycle ambiguity".

Resolving the half-cycle ambiguity typically involves waiting for the occurrence of a preamble (a short sequence transmitted at fixed intervals, the content of which is known in advance) and comparing it with the decoded sequence. In case of a sign inversion (all bits of the preamble have been decoded with inverted polarity), the receiver adjusts its carrier phase by 180°. In case of a match, the carrier phase is confirmed and does not need to change. This process must restart after each loss of tracking (i.e. after each signal interruption).

As the availability of carrier phase with integer ambiguity is key to high-accuracy positioning, there is a need for techniques to speed up the resolution of the half-cycle ambiguity and the detection of half-cycle slips.

Numerous cycle-slip detection and repair algorithms have been proposed involving detecting the presence of discontinuities in the phase measurements. These methods usually compare the detected carrier phase with a modelled value being obtained from past data, e.g. by extrapolation. They require the availability of recent data as the extrapolation quickly diverges. For this reason, they are not suitable to determine the initial half-cycle ambiguity, as in this case, the last time a given satellite was tracked may be hours ago. There is a need for a technique that can be applied independently on the time at which a given satellite was last seen.

Document U.S. Pat. No. 6,150,978 discloses a technique for quick half-cycle ambiguity resolution applicable to the GPS L1 C/A signal. The technique involves detecting a match or an inverted match between an internally stored expected data message and the incoming data. It requires memory buffers for storing past data and relies on the assumption that the navigation message transmitted by the satellite does not change often. Periodic refreshes of the memory buffer are needed to keep track of navigation message updates, and the technique cannot be applied during those refreshes.

Son et al., "A new half cycle ambiguity resolution method for GPS attitude determination system," *Proceedings of the 13th International Technical Meeting of the Satellite Division of The Institute of Navigation* (ION GPS 2000), Salt Lake City, UT, September 2000, pp. 2227-2232, proposes a method to resolve the half-cycle ambiguity by comparing data sequences from multiple antennas. The method uses the fact that demodulated data sequences from multiple antennas are identical for the same satellite. This technique is not applicable to a single-antenna configuration, and, in multi-antenna systems, is ineffective in the most usual case where the signal interruption concerns all antennas.

International patent application publication no. WO 2020/104594 A1, in the name of the present applicant, discloses a method to forge a synthetic carrier phase that could replace a measured carrier phase when not available. However, that synthetic carrier phase is affected by an unknown bias with respect to the actual carrier phase, which makes it unsuitable for half-cycle ambiguity fixing purposes.

SUMMARY

According to an aspect of the present invention, there is provided a method for determining a phase of a target data carrier in a GNSS system, the method comprising:

in an initialization phase:

determining, at a first point in time, a bias term of a synthetic carrier phase function constructed to mimic a phase of the target data carrier;

and in an operational phase:

using said bias term determined in said initialization phase, obtaining a value of the synthetic carrier phase function, said value corresponding to a second point in time; and comparing a measured phase of the target data carrier at the second point in time to said value to assess the presence or absence of a half-cycle phase discrepancy.

The term "synthetic carrier phase function" as used herein refers to a function constructed to yield phase values without half-cycle ambiguity that mimic the phase of the target data carrier, which can be calibrated by determining a fixed phase offset value or "bias" value. The synthetic carrier phase function is constructed to mimic the phase of the target data carrier at points in time subsequent to said first point in time without requiring readjustment of the determined bias term. The synthetic carrier phase function may be dependent on measured and/or received values pertaining to the target data carrier and one or more other carriers of the same GNSS system. As the bias (the difference between the value of the synthetic carrier phase function and the phase of the target data carrier) is known from the initialization phase, it can be used during the operational phase to produce an estimate of the true phase of the target data carrier at any later points in time without half-cycle ambiguity. The stored value of the bias term can remain valid indefinitely, so the calibration step only needs to be performed once, unless the receiver setup is changed.

It is an advantage of the present invention that it provides a way to monitor and resolve the half-cycle ambiguity, which is robust against navigation message updates, does not require storing past messages, and is applicable to receivers with a single antenna. It does not require external aiding and, once the bias is calibrated, it is applicable indefinitely.

In an embodiment of the method according to the present invention, the comparing comprises computing a difference between a phase of the target carrier measured at the second point in time and the value of said synthetic carrier phase function corresponding to said second point in time.

The synthetic carrier phase function takes into account the bias term determined during the initialization phase and yields an expected phase of the target data carrier at the second point in time. By subtracting the expected phase from the measured phase, one obtains an error value which may confirm the measured phase or indicate that the measured phase should be shifted by a half cycle. In this way, the half-cycle carrier phase ambiguity may be resolved.

In a particular embodiment, the difference is averaged over a certain time interval.

As the instantaneous difference may be affected by random measurement impairments (in particular, noise), it is advantageous to apply the method to a time-averaged difference, which will statistically tend to exhibit a smaller error.

In an embodiment of the method according to the present invention, the determined bias term is a single scalar value applicable to all satellites in a given constellation.

Maintaining a single global calibration value for all satellites means that new satellites can directly benefit from it, without having to go through individual calibration. Accordingly, it is an advantage of this embodiment that it leverages the properties of the set of GNSS carriers to allow for a half-cycle ambiguity cancellation with minimal memory and computation requirements, and it is applicable even for satellites that have never been tracked earlier since the start-up of the receiver.

In another embodiment of the method according to the present invention, the determining of the bias term is performed for a per-satellite basis.

It is an advantage of this embodiment that it does not require all satellites to have the same bias value. It can provide optimal half-cycle phase ambiguity cancellation for each satellite, by using an individual calibration of each satellite's carrier phase measurements.

In an embodiment of the method according to the present invention, the initialization phase is performed iteratively or continuously.

It is an advantage of this embodiment that the calibration step (determining the bias) is performed in a continuous process, and the calibration values are updated and refined over time. The continuous calibration may comprise updating the bias value on the basis of an average over a sliding window. Accordingly, the "initialization phase" may continue to run in parallel with the "operational phase".

In an embodiment of the method according to the present invention, the obtaining is conditional upon having successfully obtained values of the synthetic carrier phase function during a predetermined time.

It is an advantage of this embodiment that the reliability of the synthetic carrier phase function can be improved, especially when obtaining values of the synthetic carrier phase is also dependent on measurements of (other) GNSS signals.

In an embodiment of the method according to the present invention, the obtaining is conditional upon receiving carrier signals with a $C/N_0$ value above a predetermined threshold.

It is an advantage of this embodiment that the reliability of the results can be improved, because no decisions are taken on the basis of measurements that are known to be affected by a large amount of noise.

In an embodiment of the method according to the present invention, the target data carrier is a carrier at a first frequency $f_j$, and the synthetic carrier phase function is dependent on a detected phase of a reference carrier at a second frequency $f_i$ different from the first frequency $f_j$, and on a detected pseudorange of the reference carrier at the second frequency $f_i$.

In a particular embodiment, the synthetic carrier phase function is further dependent on a detected pseudorange of said target carrier at said first frequency $f_j$.

This embodiment is applicable to the case where carrier phase and pseudorange measurements are available from at least two different frequencies ($f_i$ and $f_j$), and where at least one of those carrier phase measurements (at frequency $f_i$) has integer ambiguity. In this embodiment, the synthetic carrier phase function is calculated from a received reference carrier at different frequency. The reference carrier may be a data carrier or a pilot carrier.

In a particular embodiment, the first frequency $f_j$ and the second frequency $f_i$ are separated by less than 100 MHz, preferably less than 50 MHz, and most preferably less than 20 MHz.

In an embodiment of the method according to the present invention, the target data carrier is a BeiDou B1I or B1C carrier.

According to an aspect of the present invention, there is provided a GNSS receiver adapted to carry out the method described above.

According to an aspect of the present invention, there is provided a computer program product comprising code means configured to cause a processor in a GNSS receiver to carry out the steps of the method described above.

The technical effects and advantages of embodiments of the GNSS receiver and the computer program product according to the present invention correspond, mutatis mutandis, to those of the corresponding embodiments of the methods according to the present invention.

BRIEF DESCRIPTION OF THE FIGURES

These and other technical features and advantages of embodiments of the present invention will now be described with reference to the accompanying drawings, in which.

DETAILED DESCRIPTION OF EMBODIMENTS

As indicated above, known methods to resolve half-cycle ambiguity in GNSS carrier signals typically involve waiting for the occurrence of a preamble (a short sequence transmitted at fixed intervals, the content of which is known in advance) and comparing it with the decoded sequence. For example, the B1I carrier of the BeiDou medium-earth-orbit satellites is modulated by a preamble every 6 seconds. In case of a sign inversion (all bits of the sequence have been decoded with inverted polarity), the receiver adjusts its carrier phase by 180°. In case of a match, the carrier phase is confirmed and does not need to change.

This process must restart after each loss of tracking (i.e. after each signal interruption). For example, when the receiver is used in a car, the process of resolving the half-cycle ambiguity is repeated each time the car passes under a bridge blocking the GNSS signal. After each signal interruption, it takes several seconds to resolve the half-cycle ambiguity.

Even when the half-cycle ambiguity has been resolved, it may be lost again during tracking, especially in case of weak signal reception. Such event is known in the art as a "half cycle slip". Half cycle slips are difficult to detect until the next preamble is received. During that interval, the carrier phase measurements are incorrect by half a cycle.

The present invention is based inter alia on the insight of the inventors that half-cycle ambiguity can be resolved more quickly if unambiguous phase information from a different source can be used for comparison.

In embodiments of the present invention, a method is provided which comprises a step in which a bias value of a synthetic carrier phase function is calibrated vis-à-vis the phase of the target data carrier at frequency $f_j$, and a step in which the measured ambiguous carrier phase of the target data carrier at frequency $f_j$ is compared to the corresponding value of the synthetic carrier phase function. This aspect of the invention is in particular applicable to the case where two carriers at respective frequencies $f_i$ (hereinafter referred to as the reference carrier) and $f_j$ (i.e., the target data carrier) are available, which do not necessarily transmit the same navigation message (the reference carrier may even be a pilot carrier, whereby the reference carrier does not suffer from half-cycle ambiguity). The synthetic carrier phase function may be a function of the integer-ambiguity carrier phase at frequency $f_i$.

The invention will now be described in more detail with reference to specific embodiments. This is done to clarify and not to limit the invention, the scope of which is determined by the accompanying claims.

Figure 1:
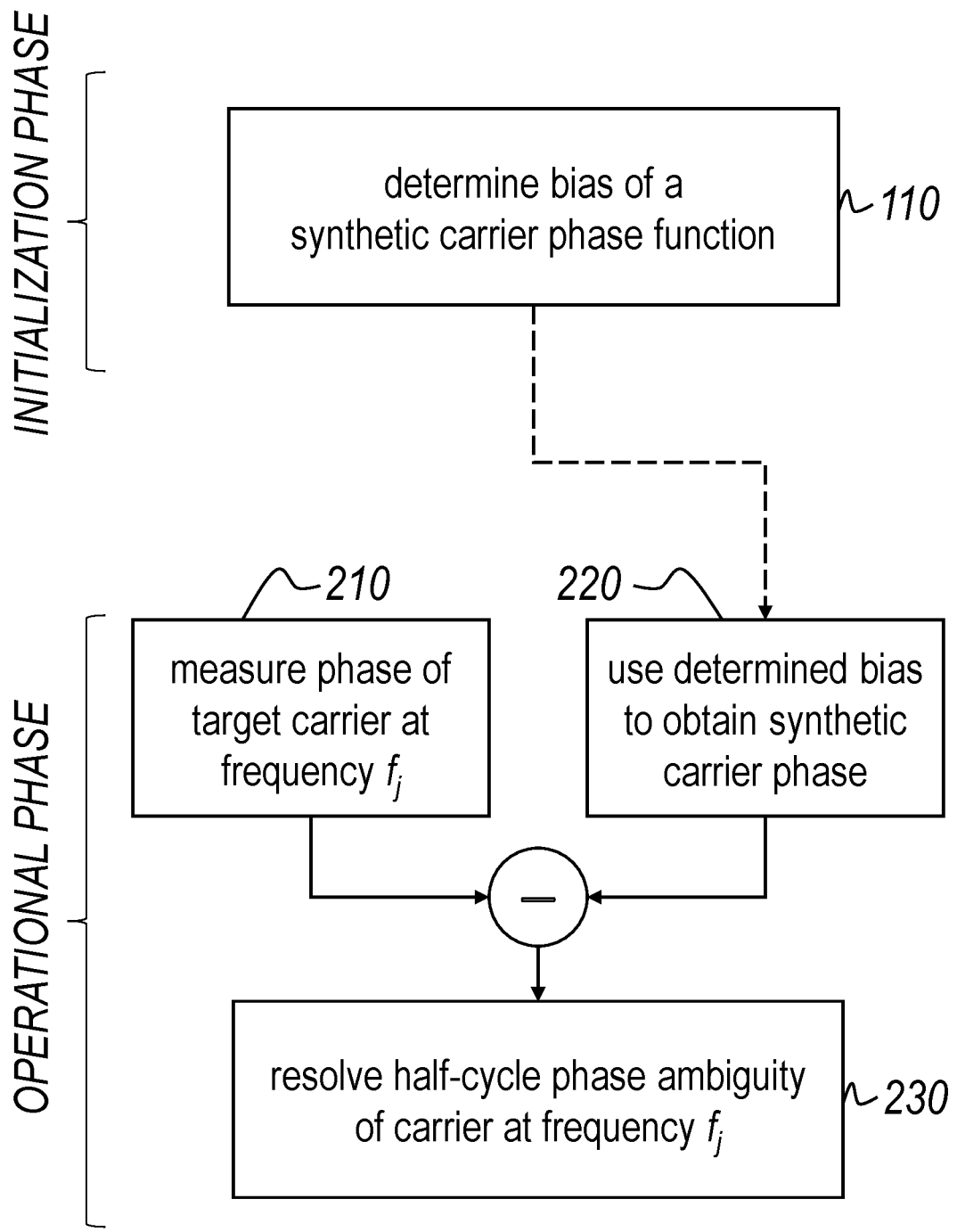
FIG. 1 presents a flow chart of an embodiment of the method according to the invention.

With reference to FIG. 1, an embodiment of the method of the invention concerns, in a general way, a method for determining a phase of a target data carrier in a GNSS system, the method comprising:

in an initialization phase:
   determining 110, at a first point in time, a bias term of a synthetic carrier phase function constructed to mimic a phase of the target data carrier;

and in an operational phase:
   using said bias term determined in said initialization phase, obtaining 220 a value of the synthetic carrier phase function, said value corresponding to a second point in time;
   comparing 230 a measured phase of the target data carrier at the second point in time 210 to said second value to assess the presence or absence of half-cycle phase discrepancy.

The invention is based inter alia on the insight of the inventors that unambiguous phase information from a different source, viz. a synthetic carrier phase function, can be used for comparison to remove half-cycle ambiguity from a target data carrier.

Preferably, the target data carrier is a carrier at a first frequency $f_j$, and the synthetic carrier phase function is dependent on a detected phase of a reference carrier at a second frequency $f_i$ different from the first frequency $f_j$, and on respective detected pseudoranges of the reference carrier at the second frequency $f_i$ and, possibly, of the target data carrier at the first frequency $f_j$.

The mathematical relationships between the characteristics of the different carriers, which underly this embodiment, are explained below.

The pseudorange and carrier phase measurements at two carrier frequencies $f_i$ and $f_j$ for a given GNSS satellite can be expressed as follows:

$$P_i = \rho + I_i + \delta P_i \qquad (1)$$

$$P_j = \rho + \frac{f_i^2}{f_j^2} I_i + \delta P_k$$

$$\varphi_i = \frac{f_i}{c}\rho - \frac{f_i}{c}I_i + N_i + \delta \varphi_i$$

$$\varphi_j = \frac{f_j}{c}\rho - \frac{f_j}{c}\frac{f_i^2}{f_j^2}I_i + N_j + \delta \varphi_j$$

In these equations, $P_i$ is the pseudorange at frequency $f_i$ in meters, $\varphi_i$ is the carrier phase at frequency $f_i$ in units of carrier cycles, $\rho$ is the satellite-to-receiver distance (and additional clock error terms that are not relevant to this invention), $N_i$ is the integer phase ambiguity, $I_i$ is the delay in the ionosphere at frequency $f_i$, in meters, $\delta P_i$ is the pseudorange bias, and $\delta \varphi_i$ is the carrier phase bias. The same symbols are used for the same variables pertaining to the carrier at frequency $f_j$, but indicated with index j in that case. c is the speed of light.

The ionospheric delay $I_i$ is typically on the order of a few meters. At maximum under extreme ionospheric activity, it can reach up to 100 m at frequencies in the L1 band around 1570 MHz.

The pseudorange bias $\delta P_i$ is the sum of a satellite-dependent and a receiver-dependent bias. Both biases are typically at the meter level. The satellite-dependent bias can usually be compensated for using information contained in the navigation message transmitted by the satellite. After compensation, the residual satellite bias is reduced to a few decimeters.

The carrier phase bias $\delta \varphi_i$ is the sum of a satellite-dependent and a receiver-dependent bias. Only the fractional part of $\delta \varphi_i$ is relevant as the integer part is absorbed into the integer ambiguity $N_i$.

Rearranging equations (1), one can express $\varphi_j$ as follows:

$$\varphi_j = \varphi_i + \frac{f_j - f_i}{c} P_i - \frac{f_j - f_i}{f_j + f_i} \frac{f_i^2}{cf_j}(P_i - P_j) + \quad (2)$$

$$N_{ji} + \delta\varphi_{ji} - \frac{f_j - f_i}{c}\delta P_i + \frac{f_j - f_i}{f_j + f_i}\frac{f_i^2}{cf_j}\delta P_{ji}$$

or:

$$\varphi_j = \varphi_i + \frac{f_j - f_i}{c}\left(1 - \frac{f_i^2}{f_j(f_j + f_i)}\right)P_i + \frac{f_j - f_i}{c}\frac{f_i^2}{f_j(f_j + f_i)}P_j + N_{ji} + B_{j,i} \quad (3)$$

where $N_{ji} = N_j - N_i$, $\delta\varphi_{ji} = \delta\varphi_j - \delta\varphi_i$, $\delta P_{ji} = \delta P_j - \delta P_i$ and $$B_{j,i} = \delta\varphi_{ji} - \frac{f_j - f_i}{c}\delta P_i + \frac{f_j - f_i}{f_j + f_i} \cdot \frac{f_i^2}{cf_j} \cdot \delta P_{ji} \quad (4)$$

Equation (3) shows that it is possible to derive the carrier phase at frequency $f_j$ ($\varphi_j$) from the carrier phase at frequency $f_i$ ($\varphi_i$), using the pseudoranges at frequencies $f_i$ and $f_j$, and provided the bias $B_{j,i}$ is known. This function can therefore serve as the synthetic carrier phase function referred to above, which can simply be calibrated by fixing the value of the bias term $B_{j,i}$.

The integer ambiguity term $N_{ji}$ is irrelevant, as carrier phase measurements are always defined with an integer ambiguity.

The $B_{j,i}$ term is the conversion bias when deriving the carrier phase at frequency $f_j$ from the carrier phase at frequency $f_i$. It is a combination of satellite and receiver biases and it is different for each frequency combination. Only its fractional part (i.e. its modulo 1 cycle) is relevant as any integer part is absorbed by $N_{ji}$. When pseudoranges and carrier phases are available at frequencies $f_i$ and $f_j$, $B_{j,i}$ can be estimated from equation (3):

$$B_{j,i} = \quad (5)$$

$$FRAC\left(\varphi_j - \varphi_i - \frac{f_j - f_i}{c}\left(1 - \frac{f_i^2}{f_j(f_j + f_i)}\right)P_i - \frac{f_j - f_i}{c}\frac{f_i^2}{f_j(f_j + f_i)}P_j\right)$$

Where FRAC(x) yields the fractional part of x.

Figure 2:
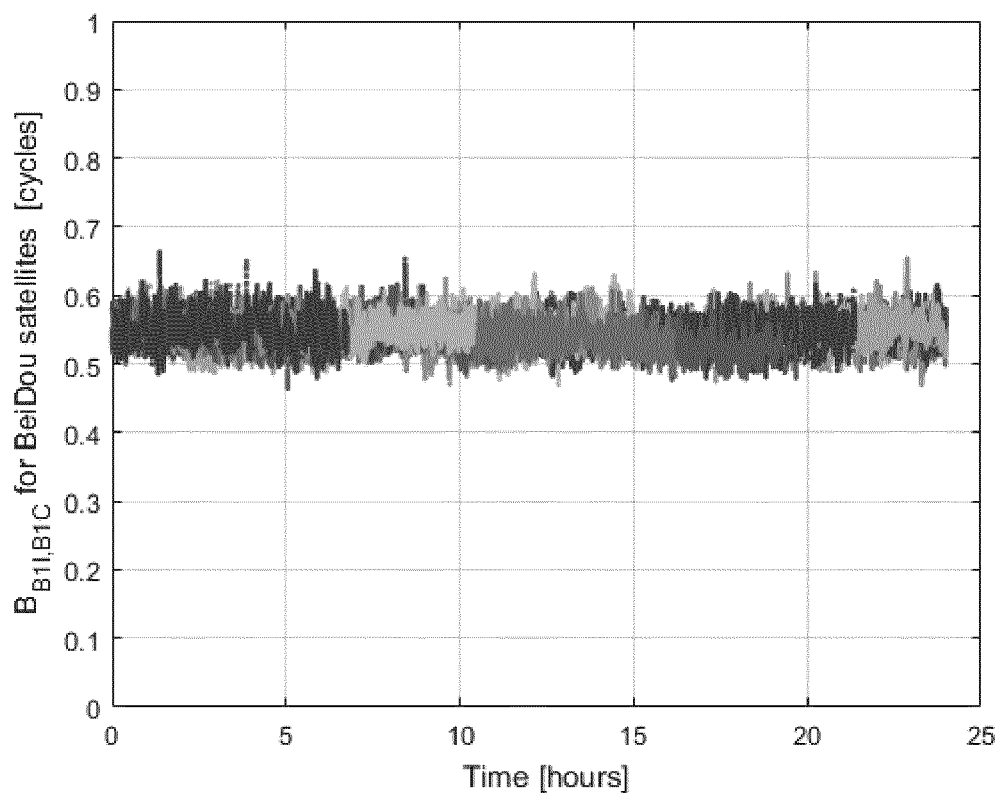
FIG. 2 illustrates the conversion bias from BeiDou B1C carrier phases to BeiDou B1I carrier phases.

For some signal combinations and some satellite types, the $B_{j,i}$ bias turns out to be stable in time. FIG. 2 shows the case where $f_j$ is the BeiDou B1I carrier at 1561.098 MHz and $f_i$ is the BeiDou B1C carrier at 1575.42 MHz. Each color corresponds to the pass of a satellite and the plot shows all the passes over a day. FIG. 2 shows that the $B_{B1I,B1C}$ biases are not only constant over time, but also identical for all BeiDou satellites. This property is unique to some satellite systems and some signal combinations. As will be explained below, it can be used to our advantage to detect and resolve half-cycle slips in an efficient manner.

It is worth nothing that the specific $B_{j,i}$ value depends on the receiver setup (antenna, antenna cables, amplifiers, . . . ) and is not known in advance. It must be calibrated. In the example shown in FIG. 2, $B_{B1I,B1C}$ is close to 0.55 cycles.

An embodiment of the invention may therefore involve the following phases:

1. Calibration:
   a. Determine the carrier phases and pseudoranges at frequencies $f_i$ and $f_j$ and solve the half-cycle ambiguity in the usual way.
   b. When the carrier phases at both frequencies $f_i$ and $f_j$ are free of half-cycle ambiguity, compute the $B_{j,i}$ bias using equation (5).
   c. Optionally, average the $B_{j,i}$ values over the satellites in view and over a certain period of time (for instance, 10 seconds).
   d. Store the (optionally averaged) $B_{j,i}$ value for further reference. The stored value can remain valid indefinitely, so calibration only needs to be performed once, unless the receiver setup is changed.

2. Operation:
   a. Whenever the half-cycle ambiguity is resolved at frequency $f_i$, but not resolved (or uncertain) at frequency $f_j$, determine the half-cycle ambiguity at $f_j$ by first computing the difference D between the measured (and ambiguous) carrier phase at frequency $f_j$ and a corrected synthetic carrier phase derived from equation (3):

$$D = \varphi_j - \varphi_i - \frac{f_j - f_i}{c}\left(1 - \frac{f_i^2}{f_j(f_j + f_i)}\right)P_i - \frac{f_j - f_i}{c}\frac{f_i^2}{f_j(f_j + f_i)}P_j - B_{k,i} \quad (6)$$

where $\varphi_i$, $\varphi_j$, $P_i$ and $P_j$ are the measured carrier phases and pseudoranges ($\varphi_j$ has a half-cycle ambiguity, and $\varphi_i$ has an integer ambiguity), and $B_{j,i}$ is the bias stored during the calibration phase. Instead of equation (6), the following simpler equation (6') may also be used. This equation is an accurate approximation of (6) when the difference between the $f_i$ and $f_j$ frequency is small:

$$D = \varphi_j - \varphi_i - \frac{f_j - f_i}{c}P_i - B_{k,i} \quad (6')$$

b. D should be close to a multiple of 0.5 cycles. If the distance between D and the nearest multiple of 0.5 cycles is lower than a given threshold, e.g. 0.1 cycle, the half-cycle ambiguity (HCO) is resolved by rounding D to the nearest multiple of 0.5 cycles:

$$HCO = ROUND(D \times 2) \quad (7)$$

If HCO is even, the measured carrier phase at frequency $f_j$ is correct. If it is odd, a half-cycle offset is present and must be corrected.

Correct determination of the half-cycle ambiguity depends on the accuracy at which D can be determined, i.e. on the noise on D from equation (6). The uncertainty on D should be smaller than 0.25 cycles for correct determination of the half-cycle ambiguity. The standard deviation of the noise on D is given by the following formula:

$$\sigma_D = \sqrt{2\sigma_\varphi^2 + \left(\frac{f_j - f_i}{c}\left(1 - \frac{f_i^2}{f_j(f_j + f_i)}\right)\right)^2 \sigma_P^2 + \left(\frac{f_j - f_i}{c}\frac{f_i^2}{f_j(f_j + f_i)}\right)^2 \sigma_P^2 + \sigma_B^2} \quad (8)$$

With $\sigma_\varphi$, $\sigma_P$ and $\sigma_B$ the standard deviation of the noise on the carrier phase measurement, the pseudorange and the $B_{j,i}$ bias determined during calibration.

According to equation (8), the noise on D mainly depends on the frequencies $f_i$ and $f_j$, and is lower when $f_i$ and $f_j$ are closer to each other. This embodiment of the method according to the invention is therefore primarily of interest for pairs of carrier frequencies that are close to each other, e.g. separated by less than a few tens of MHz.

For example, in the case of the BeiDou B1I and B1C frequencies, $f_j$=1561.098 MHz and $f_i$=1575.42 MHz and the frequency separation is only 14.3 MHz. In this case, equation (8) becomes:

$$\sigma_D = \sqrt{2\sigma_\varphi^2 + 0.000555\sigma_P^2 + 0.000586\sigma_P^2 + \sigma_B^2} \quad (9)$$

Typical values for $\sigma_\varphi$, $\sigma_P$, and $\sigma_B$ are 0.02 cycles, 0.02 m, and 0.02 cycles respectively, yielding a $\sigma_D$ of 0.036 cycles. This is well below the 0.25 cycle threshold required for correct half-cycle ambiguity resolution.

To improve the accuracy, D from equation (6) can be averaged over some time before estimating the ambiguity using equation (7). For example, the averaging could be performed over a sliding window spanning a period of 1 second.

Embodiments of the invention may be combined with the various optional features described in the "Summary" section of the present application.

The present invention also pertains to a GNSS receiver adapted to carry out the methods described above. In a GNSS receiver adapted to carry out the methods described herein, the steps of the methods may be performed by programmable hardware components (e.g. general-purpose processors, DSPs, and the like) with appropriate software, configurable hardware components (e.g. FPGA), dedicated hardware components (e.g. ASIC), or any combination thereof. The same component(s) may also provide other functions.

The present invention also pertains to a computer program product comprising code means configured to cause a processor, when executed, to perform the steps of the method according to the present invention. The computer program product may, without limitation, comprise software stored on a computer-readable medium (such as an optical, magnetic, or semiconductor-based memory) or a downloadable software application.

Exemplary embodiments of the present invention are defined by the following numbered clauses:

1. A method for determining a phase of a target data carrier in a GNSS system, the method comprising:
   in an initialization phase:
      determining (110), at a first point in time, a bias term of a synthetic carrier phase function constructed to mimic a phase of the target data carrier; and
   in an operational phase:
      using said bias term determined in said initialization phase, obtaining (220) a value of the synthetic carrier phase function, said value corresponding to a second point in time; and
      comparing (230) a measured phase of the target data carrier at the second point in time (210) to said value to assess the presence or absence of a half-cycle phase discrepancy;
   wherein said synthetic carrier phase function is constructed to mimic said phase of said target data carrier at points in time subsequent to said first point in time without requiring readjustment of said determined bias term.

2. The method according to clause 1, wherein said comparing comprises computing a difference between a phase of said target data carrier measured at said second point in time and said value.

3. The method according to clause 2, wherein said difference is averaged over a certain time interval.

4. The method according to any of the preceding clauses, wherein said determined bias term is a single scalar value applicable to all satellites in a given constellation and for a given combination of frequencies.

5. The method according to any of the clauses 1-3, wherein said determining of said bias term is performed for a per-satellite basis.

6. The method according to any of the preceding clauses, wherein said initialization phase is performed iteratively or continuously.

7. The method according to any of the preceding clauses, wherein said obtaining (220) is conditional upon having successfully obtained values of said synthetic carrier phase function during a predetermined time.

8. The method according to any of the preceding clauses, wherein said obtaining (220) is conditional upon receiving carrier signals with a $C/N_0$ value above a predetermined threshold.

9. The method according to any of the preceding clauses, wherein said target data carrier is a carrier at a first frequency $f_j$, and wherein said synthetic carrier phase function is dependent on a detected phase of a reference carrier at a second frequency $f_i$ different from said first frequency $f_j$, and on a detected pseudorange of said reference carrier at said second frequency $f_i$.

10. The method according to clause 9, wherein said synthetic carrier phase function is further dependent on a detected pseudorange of said target carrier at said first frequency $f_j$.

11. The method according to clause 9 or clause 10, wherein said first frequency $f_j$ and said second frequency $f_i$ are separated by less than 100 MHz, preferably less than 50 MHz, and most preferably less than 20 MHz.

12. The method according to any of the preceding clauses, wherein said target data carrier is a BeiDou B1I or B1C carrier.

13. A GNSS receiver adapted to carry out the method according to any of the preceding clauses.

14. A computer program product comprising code means configured to cause a processor in a GNSS receiver to carry out the steps of the method according to any of clauses 1-12.

While the invention has been described hereinabove with reference to specific embodiments, this was done to clarify and not to limit the invention, the scope of which is determined by the accompanying claims.

The invention claimed is:

1. A method for determining a phase of a target data carrier in a Global Navigation Satellite System (GNSS) system, the method comprising:
in an initialization phase:
determining, at a first point in time, a bias term of a synthetic carrier phase function constructed to mimic said phase of the target data carrier, said synthetic carrier phase function providing phase information without half-cycle ambiguity;
and
in an operational phase:
using said bias term determined in said initialization phase, obtaining a value of the synthetic carrier phase function, said value corresponding to a second point in time; and
comparing a measured phase of the target data carrier at the second point in time to said value to assess presence or absence of a half-cycle phase discrepancy;
wherein said synthetic carrier phase function is constructed to mimic said phase of said target data carrier at points in time subsequent to said first point in time without requiring readjustment of said bias term determined in said initialization phase; and
wherein said target data carrier is a carrier at a first frequency $f_j$, and wherein said synthetic carrier phase function is dependent on a detected phase of a reference carrier at a second frequency $f_i$ different from said first frequency $f_j$, and on a detected pseudorange of said reference carrier at said second frequency $f_i$.

2. The method according to claim 1, wherein said comparing comprises computing a difference between a phase of said target data carrier measured at said second point in time and said value.

3. The method according to claim 2, wherein said difference is averaged over a certain time interval.

4. The method according to claim 1, wherein said bias term determined in said initialization phase is a single scalar value applicable to all satellites in a given constellation and for a given combination of frequencies.

5. The method according to claim 1, wherein said determining of said bias term determined in said initialization phase is performed on a per-satellite basis.

6. The method according to claim 1, wherein said initialization phase is performed iteratively or continuously.

7. The method according to claim 1, wherein said obtaining is conditional upon having successfully obtained values of said synthetic carrier phase function during a predetermined time.

8. The method according to claim 1, wherein said obtaining is conditional upon receiving carrier signals with a $C/N_0$ value above a predetermined threshold.

9. The method according to claim 1, wherein said synthetic carrier phase function is further dependent on a detected pseudorange of said target data carrier.

10. The method according to claim 1, wherein said first frequency $f_j$ and said second frequency $f_i$ are separated by less than 100 MHz.

11. The method according to claim 1, wherein said target data carrier and said reference carrier are transmitted by a satellite in such a way that said bias term determined in said initialization phase is stable over time.

12. The method according to claim 11, wherein said target data carrier is a BeiDou B1I or B1C carrier.

13. A GNSS receiver adapted to carry out the method according to claim 1.

14. A non-transitory computer-readable medium storing instructions that, when executed, cause a processor in a GNSS receiver to carry out the method according to claim 1.

15. The method according to claim 2, wherein said bias term determined in said initialization phase is a single scalar value applicable to all satellites in a given constellation and for a given combination of frequencies.

16. The method according to claim 3, wherein said bias term determined in said initialization phase is a single scalar value applicable to all satellites in a given constellation and for a given combination of frequencies.

17. The method according to claim 2, wherein said determining of said bias term determined in said initialization phase is performed on a per-satellite basis.

18. The method according to claim 3, wherein said determining of said bias term determined in said initialization phase is performed on a per-satellite basis.

19. The method according to claim 2, wherein said initialization phase is performed iteratively or continuously.

20. The method according to claim 3, wherein said initialization phase is performed iteratively or continuously.

* * * * *